United States Patent
Li et al.

(10) Patent No.: US 11,970,624 B2
(45) Date of Patent: Apr. 30, 2024

(54) INKJET INK AND PRIMER FLUID SET

(71) Applicant: DUPONT ELECTRONICS, INC., Wilmington, DE (US)

(72) Inventors: Xiaoqing Li, Newark, DE (US); Ji Yeon Huh, Newark, DE (US); Cullen Kirkpatrick, Phoenixville, PA (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 150 days.

(21) Appl. No.: 17/757,015

(22) PCT Filed: Dec. 9, 2020

(86) PCT No.: PCT/US2020/063873
§ 371 (c)(1),
(2) Date: Jun. 8, 2022

(87) PCT Pub. No.: WO2021/126611
PCT Pub. Date: Jun. 24, 2021

(65) Prior Publication Data
US 2023/0027658 A1   Jan. 26, 2023

Related U.S. Application Data

(60) Provisional application No. 62/949,783, filed on Dec. 18, 2019.

(51) Int. Cl.
| | |
|---|---|
| *C09D 11/322* | (2014.01) |
| *B41J 2/21* | (2006.01) |
| *C09D 11/38* | (2014.01) |
| *C09D 11/40* | (2014.01) |
| *C09D 11/54* | (2014.01) |

(52) U.S. Cl.
CPC ............ *C09D 11/322* (2013.01); *B41J 2/21* (2013.01); *C09D 11/38* (2013.01); *C09D 11/40* (2013.01); *C09D 11/54* (2013.01); *B41J 2202/03* (2013.01)

(58) Field of Classification Search
CPC ....... C09D 11/40; C09D 11/322; C09D 11/38; C09D 11/102; C09D 11/106; C09D 11/107; C09D 11/54
USPC ........................................................ 347/100
See application file for complete search history.

(56) References Cited

U.S. PATENT DOCUMENTS

| | | |
|---|---|---|
| 5,022,592 A | 6/1991 | Zakheim et al. |
| 5,026,427 A | 6/1991 | Mitchell et al. |
| 5,085,698 A | 2/1992 | Ma et al. |
| 5,231,131 A | 7/1993 | Chu et al. |
| 5,310,778 A | 5/1994 | Shor et al. |
| 5,891,231 A | 4/1999 | Gnerlich et al. |
| 5,976,232 A | 11/1999 | Gore |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 9,255,207 B2 | 2/2016 | Berge et al. |
| 2003/0089277 A1 | 5/2003 | Zakheim et al. |
| 2007/0060670 A1 | 3/2007 | Ellis |
| 2008/0092309 A1 | 4/2008 | Ellis et al. |
| 2012/0214939 A1 | 8/2012 | Li et al. |
| 2014/0356555 A1 | 12/2014 | Toles et al. |
| 2019/0092956 A1* | 3/2019 | Imanaga ................ C09D 11/40 |
| 2019/0276692 A1* | 9/2019 | Furukawa ............ B41M 5/5218 |
| 2022/0073773 A1* | 3/2022 | Sarkisian ............. C09D 11/102 |

FOREIGN PATENT DOCUMENTS

| | | |
|---|---|---|
| EP | 0556649 B1 | 6/1999 |
| EP | 2362014 A2 | 8/2011 |
| EP | 3211048 A1 | 8/2017 |
| WO | 2008/033569 A2 | 3/2008 |
| WO | 2019/126042 A1 | 6/2019 |

OTHER PUBLICATIONS

"The Pigment Handbook", vol. 1, 2nd Ed., John Wiley & Sons, NY (1988) (copy not provided).
Society of Dyers and Colourists, Bradford, Yorkshire, UK and published in The Color Index, Third Edition, 1971 (copy not provided).
PCT International Search Report for Application No. PCT/US2020/063873; Schmitz, Volker, Authorized Officer; ISA/EPO; dated Mar. 12, 2021.

* cited by examiner

*Primary Examiner* — Jason S Uhlenhake
*Assistant Examiner* — Alexander D Shenderov

(57) ABSTRACT

The present disclosure provides an inkjet ink and primer fluid set containing an aqueous primer composition, an aqueous white inkjet ink, and aqueous non-white colored inkjet inks. The aqueous primer composition forms a coating on a print substrate. This fluid set is particularly suitable for printing on non-porous plastic substrate.

16 Claims, No Drawings

INKJET INK AND PRIMER FLUID SET

CROSS REFERENCE TO RELATED APPLICATIONS

This application claims priority under 35 U.S.C. § 119 from U.S. Provisional Application Ser. No. 62/949,783, filed Dec. 18, 2019.

BACKGROUND OF THE DISCLOSURE

This disclosure pertains to an inkjet ink and primer fluid set containing an aqueous primer composition, an aqueous white inkjet ink, and aqueous non-white colored inkjet inks. The aqueous primer composition forms a coating on a print substrate. This fluid set is particularly suitable for printing on non-porous plastic substrate.

Inkjet printing is a non-impact digital printing process in which droplets of ink are deposited on a substrate, such as paper, to form the desired image. Inkjet printers are equipped with an ink set which, for full color printing, typically comprises a cyan, magenta and yellow ink (CMY). An ink set also typically comprises a black ink (CMYK) with the black being the most common ink.

Inkjet printing is becoming increasingly important for markets other than conventional desktop printing for small office/home office. Digital printing methods have gained popularity in textiles, commercial and packaging printing and offer a number of potential benefits over conventional printing methods such as screen printing, offset printing, flexo and gravure printing. Inkjet digital printing eliminates the setup expense associated with screen and plate preparation and can potentially enable cost effective short run production. Inkjet printing furthermore allows visual effects such as tonal gradients and infinite pattern repeat sizes that cannot be practically achieved with a screen and other analog printing processes.

Aqueous inkjet ink has grown rapidly in packaging application in recent years, because it is a digital technology with less environmental impact compared to UV and solvent digital inks. Non-porous plastics, including both flexible plastic films and rigid plastics, are common media/substrate for packaging applications. The surfaces of these plastics are non-liquid absorbing and hydrophobic by nature, and impose many performance challenges for aqueous pigmented inks. Among them a key challenge is poor image quality due to slow setting of the ink drops as the results of non-ink absorbing of the printing surface and low temperature drying to avoid plastic substrate distortion. Slow fixation and drying of the ink drops can lead to blurry image and inter-color bleed, which worsen especially when printing at high speed.

To improve print image quality on a hydrophobic substrate, a common approach is to coat the hydrophobic surface with a primer or pretreatment fluid. U.S. Patent Application Publication No. 2008/0092309 discloses a pretreatment solution for treating textile. The pretreatment solution contains a nonionic latex polymer and a multivalent cationic salt solution. U.S. Patent Application Publication No. 2014/356555 discloses an inkjet printing media containing base substrate and a coating layer. The coating layer contains a source of polyvalent ions and a latex binder that forms a coherent film in the presence of the polyvalent ions. The base substrate may include paper, cloth, nonwoven fabric, felt, and synthetic (non-cellulosic) papers. However, these disclosures do not address printing on a non-porous plastic film substrate which differs from other common substrates in that a non-porous plastic film is completely non-liquid permeable and difficult to adhere to due to weak interaction between plastic polymers and inks, and that a non-porous plastic often requires low drying and curing temperatures because it is less tolerant to heat. Furthermore, clear non-porous plastic films, which are widely used in packaging application, require a special primer that can afford film clarity. In addition, different from printing on paper, printing on a clear or transparent film commonly requires a white ink to be printed on top of or beneath the colored image to enhance contrast and make the colored image more visually distinctive.

A need exists for an improved inkjet ink set and primer fluid combination that can produce higher quality print images on non-porous plastic film surfaces, especially with better film clarity for clear non-porous plastic films. The present disclosure satisfies this need by providing an inkjet ink and primer fluid set containing a primer, and inkjet inks. The primer forms a coating with a limited increase in haze, and interacts with the inkjet inks to achieve higher quality print images on non-porous plastic films.

SUMMARY OF THE DISCLOSURE

An embodiment of the present disclosure provides an inkjet ink and primer fluid set comprising:
  a) an aqueous primer composition comprising a multivalent cation salt and a polymeric binder, wherein said composition forms a coating with a dry thickness of from 0.4 to 5.0 micron upon application onto a non-porous plastic substrate, and said coating results in a haze increase of less than 10 on said substrate, said multivalent cation salt is present at an amount less than 20 wt %, based on the total weight of the primer composition, and said polymeric binder is not soluble in water, is stable in the presence of said multivalent cation, and is selected from the group consisting of urethane polymer, acrylic polymer and vinyl polymer;
  b) an aqueous white inkjet ink comprising a titanium oxide pigment dispersion, and a polyurethane binder or an acrylic binder, wherein said titanium oxide pigment dispersion having a particle size with D50 in the range of 200 to 350 nm; and
  c) one or more aqueous non-white colored inkjet inks, wherein at least one of the inks comprising a pigment dispersion, and a second polyurethane binder or a second acrylic binder.

Another embodiment provides that the aqueous primer composition further comprising silica particles.

Another embodiment provides that the coating results in a haze increase of less than 5 on said substrate.

Another embodiment provides that the polyurethane binder and the second polyurethane binder are the same.

Another embodiment provides that the acrylic binder and the second acrylic binder are the same.

Another embodiment provides that the polymeric binder is urethane polymer.

Another embodiment provides that the polymeric binder is acrylic polymer.

Another embodiment provides a method of digitally printing an image onto a non-porous plastic substrate comprising the steps of:
  (a) providing an inkjet printer that is responsive to digital data signals;
  (b) providing a non-porous plastic substrate;
  (c) applying an aqueous primer composition comprising a multivalent cation salt and a polymeric binder onto the non-porous plastic substrate to form a coating with a dry thickness of from 0.4 to 5.0 micron, wherein said coating results in a haze increase of less than 10 on said substrate, said multivalent cation salt is present at an amount less than 20 wt %, based on the total weight of the primer composition, and said polymeric binder is not soluble in water, is stable in the presence of said multivalent cation, and is selected from the group consisting of urethane polymer, acrylic polymer and vinyl polymer;

(d) loading the printer with an aqueous white inkjet ink and one or more aqueous non-white colored inkjet inks, wherein said white inkjet ink comprising a titanium oxide pigment dispersion, and a polyurethane binder or an acrylic binder, said titanium oxide pigment dispersion having a particle size of D50 in the range of 200 to 350 nm; and wherein at least one of the aqueous non-white colored inkjet inks comprising a pigment dispersion, and a second polyurethane binder or a second acrylic binder; and (e) printing onto the primer coated substrate of step (c) using the white inkjet ink and non-white colored inkjet inks in response to digital signals.

Another embodiment provides that the digital signals cause the white inkjet ink to be printed before the non-white colored inkjet inks are printed in step (e) above.

Yet another embodiment provides that the digital signals cause the white inkjet ink to be printed after the non-white colored inkjet inks are printed in step (e) above.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "dispersion" means a two-phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "aqueous vehicle" refers to water or a mixture of water and at least one water-soluble, or partially water-soluble (i.e., methyl ethyl ketone), organic solvent (co-solvent).

As used herein, the term "substantially" means being of considerable degree, almost all.

As used herein, the term "dyne/cm" means dyne per centimetre, a surface tension unit.

As used herein, the term "cP" means centipoise, a viscosity unit.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Non-Porous Plastic Substrate

Non-porous plastic substrate or film is one of the main substrates used in flexible packaging. Flexible packaging is a container made of materials that can be quickly changed in shape when they're filled or closed. These containers can use paper, non-porous plastic film or foil materials in any combination. A non-porous plastic film typically includes, but not limited to, the following:

High Density Polyethylene (HDPE),

Low Density Polyethylene (LDPE) Includes Linear Low Density Polyethylene (LLDPE), Polyethylene Terephthalate (PET), Metallized PET (Met-PET), glass coated PET, acrylic coated PET, Polypropylene (PP) includes Casted PP (CPP), Oriented PP (OPP), Biaxial Oriented PP (BOPP) and Metallized OPP (MOPP), Polystyrene, Nylon, Polyvinyl Chloride (PVC, Vinyl), Ethylene Vinyl Acetate polymer (EVA), and Ethylene Vinyl Alcohol copolymer (EVOH).

Each film features different capabilities and characteristics that makes it suitable for specific applications. Alternatively, the films can be combined to create multilayer films with distinct barrier properties for better protection or longer shelf life. The customization element extends to visual properties as well, including clarity, glossiness, and high-quality printed graphics in an array of colors and designs to wrap the product in style and to include important information right on the package. These substrate films may be non-oriented or oriented films. The thickness of the substrate film is not critical, but usually only needs to be in the range of 1 to 500 µm. The print surface of the substrate film has preferably been treated with a corona discharge. Silica or alumina, for example, may have been deposited on the surface of the film.

Primer Composition

The aqueous primer fluid should comprise sufficient ink-aggregating agent to provide adequate fixation of the inkjet inks. Typically, the primer will comprise at least about 0.5 wt % of the ink-aggregating agent, and amounts can be used up to the solubility limits of the particularly ink-aggregating agent utilized. Preferably, the primer will comprise from about 1 wt % to about 30 wt % of the ink-aggregating agent, based on the total weight of the primer fluid.

A polymeric binder is combined with an ink-aggregating agent to form a primer fluid. The polymeric binder is advantageously used at levels, based on the total weight of ink, of at least about 5%, and typically at least about 10%. Upper limits are dictated by primer viscosity or other physical limitations. In a more typical embodiment, no more than about 50% polymeric binder is present in the primer composition, and even most typically no more than about 40%, based on the total weight of the primer fluid. The combined total weight of the polymeric binder and ink-aggregating agent can be up to about 45 wt %, based on the total weight of the primer fluid.

The Primer composition further comprises a surfactant to provide wetting on film substrate. Some suitable surfactants include surfactants that are miscible with ink-aggregating agent and polymers, i.e., those that do not form precipitates or aggregates when mixing. Some useful surfactants include cationic, non-ionic, and amphoteric surfactants. Some suitable cationic surfactants include, for example, quaternized ammonium or pyridinium surfactants, such as dodecyltrimethylammonium chloride, cetyltrimethylammonium bromide, cetyltrimethylpyridinium chloride and others. Some suitable non-ionic surfactants include ethoxylated acetylene diols (e.g. Surfynol® series from Evonik), ethoxylated primary alcohols (e.g. Neodol® series from Shell) and secondary alcohols (e.g. Tergitol® series from Dow Chemical), Pluronic® block copolymer surfactants, sulfosuccinates (e.g. Aerosol® series from Cytec), organosilicones (e.g. Dynol™ series from Evonik) and fluoro surfactants (e.g. Zonyl® series from Chemours). Amphoteric surfactants that, within a certain pH range, are cationic may also be used. In this case the pH of the liquid composition must be adjusted below the isoelectric point of the surfactant. Some examples of useful zwitterionic surfactants include N,N-dimethyl-N-tetradecyl amine oxide (NTAO), N,N-dimethyl N-hexadecyl amine oxide (NHAO) and related amine oxide compounds. Another example is N-dodecyl-N,N-dimethyl glycine. Yet other examples include phosphates, phosphites, phosphonates, lecithins and the like, and phosphonate esters such as phosphomyelin. Surfactants may be used, typically in the amount of about 0.1 to about 10% and more typically about 0.5 to about 5%, based on the total weight of the primer fluid.

Primer may further comprise additional additives to modify viscosity, prevent film curling or improve block resistance including, but not limit to, colloidal silica dispersion and wax emulsion. Preferred colloidal silica dispersions are nano-size silica particles stabilized by cationic charge, or no charge as long as the silica dispersions are stable when mixing with ink aggregating agent. Examples include surface treated silica SNOWTEX® ST-AK, ST-AK-ML, ST-AK-L, ST-AK-A and ST-AK-XK (Nissan Chemical America, Houston TX), and silica with elongated shape SNOWTEX® ST-OUP and string-of-pearls SNOWTEX® ST-PS-SO and ST-PS-MO. Colloidal silica may be used typically in the amount of 1% to 50% based on the total weight of the primer fluid. Examples of wax emulsions include, but not limit to, olefin wax such as LDPE, HDPE and PP, paraffin wax, carnauba wax, and amide wax colloidal stabilized with non-ionic emulsification so it is stable when mix with ink aggregating agent. Preferred wax examples are AQUACER 539, AQUACER 513, AQUACER 519 and AQUACER 497 (BYK-Chemie Wesel, Germany). Wax may be used, typically in the amount of 0.05% to 5%, based on the total weight of the primer fluid, as long as the primer coating is transparent.

Other ingredients in the primer solution may further include, but are not limited to, humectants and biocides. Biocides prevent microbial degradation—their selection and use is generally well known in the art. Suitable humectants are the same as those suitable for use in colored inkjet inks, as discussed in further detail below.

Ink-Aggregating Agent

The primer solution contains an ink-aggregating agent that "precipitates" or "crashes" with a colorant or other ingredient(s) in an ink. Preferred ink-aggregating agents include multivalent metal salts, and/or organic acid.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are substantially soluble in the aqueous primer solution and preferably exist (in solution) in a substantially ionized state so that they are in a form where they are free and available to interact with the inkjet inks.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In another embodiment, the multivalent cation comprises at least one of Mg, Ca, Ba, Ru, Co, Zn and Ga. In yet another embodiment, the multivalent cation comprises at least one of Ca, Ba, Ru, Co, Zn and Ga. Preferably the multivalent cations are Mg and Ca.

$Z^x$ can be incorporated into primer solution by addition in a salt form or by addition in an alkaline form and used as a base in the adjustment of the primer solution pH.

The associated anionic material can be chosen from any common anionic material, especially halides, nitrates and sulfates. The anionic form is chosen so that the multivalent cation is soluble in the aqueous primer solution. The multivalent cationic salts can be used in their hydrated form. One or more multivalent cationic salts may be used in the primer solution.

For Ca, the preferred multivalent cation salts are calcium chloride, calcium nitrate, calcium nitrate hydrate and mixtures thereof.

For Mg, the preferred multivalent cation salts are magnesium chloride, magnesium nitrate, magnesium nitrate hydrate, and mixtures thereof.

An organic acid as aggregating agent precipitates ink drops by lowering the ink's pH and coagulating pigment dispersion and other ink components. Specific examples of acids are polyacrylic acid, acetic acid, glycolic acid, malonic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid and derivatives of these compounds. Polyacrylic acid and acetic acid are particularly preferred Primer Polymeric Binder The primer solution contains compatible polymeric binder(s) which do not "precipitate" or "crash" with the aggregating agent. The primer polymeric binder and ink-aggregating agent solution thus formed must be stable as a solution or as a stable emulsion to permit the coating of the film substrate. If the primer polymeric binder gels, or its emulsion precipitates in the presence of an ink-aggregating agent, e.g., a multivalent cationic salt solution, then it cannot be used as a primer additive. A screening test to determine whether a primer polymeric binder is stable in the presence of an ink-aggregating agent is to mix a 10 wt % polymer (on a dry basis) and a 15 wt % of calcium nitrate tetrahydrate and observe whether the solution/emulsion is stable. The stability is observed at ambient temperature (~25° C.), and at intervals of 10 minutes and 24 hours. The primer polymeric binder must lead to a stable polymer/multivalent cationic solution/emulsion mixture.

Some suitable compatible polymeric binders include, for example, non-ionic water insoluble polymers in colloidal particle form which include acrylic latexes, polyurethane dispersions, vinyl acetate copolymer latexes, polyester and polyamide dispersions. These polymers may be made by any known process including, but not limited to, free radical, group transfer, ionic, RAFT, condensation and other types of polymerization.

A primer polymeric binder can be formed from the incorporation of a nonionic stabilizer either chemically bound or physically absorbed into the polymer. Examples of nonionic reactive components include, ethylene oxide derivatives, acrylamide, hydroxyethyl-substituted monomers, vinylpyrrolidone, ethyleneimines, and the like. The incorporation can occur during the polymerization step, or after the polymerization step which prepares the latex polymer. In the case of an ethylene oxide nonionic component, the substitution can take the form of incorporating a glycol with sufficient (—$CH_2$—$CH_2O$—)$_n$ units to impart the nonionic stability. For instance, a polyurethane may have an alkyl polyethylene glycol incorporated into the nonionic polyurethane. The nonionic component can be the main component in nonionic latex polymer, as long as its properties satisfy the stability test described above.

A primer polymeric binder may also have ionic components incorporated into the polymer. By example, for the polyurethanes ionic components such as acids may be used in the polyurethane reaction and a specific acid example is dimethylolpropionic acid. For the acrylamide and hydroxyethyl substituted nonionic latex polymer, the ionic source can be from (meth)acrylic acids. There are limits to the amount of ionic components in the polymer, since the ionic components may complex with the ink-aggregating agent that will lead to instability of the polymer/multivalent cationic solution. The balance of nonionic and ionic components must lead to a stable solution as described above.

Application of Primer

Prior to printing inkjet inks, film substrate is coated with the primer fluid via various coating methods available including flexographic, gravure, rod, spray, roll, curtain and knife coating methods. Preferred methods are flexographic, gravure and rod coating methods. The application of the primer is in-line or off-line with the inkjet ink printing process depending on printer design and machine integration. Regardless of coating methods, primer is sufficiently dried before printing inkjet inks. Drying process is not limited to any method, varying from hot air, infrared and near-infrared radiation, as long as the temperature is not too high to distort the film integrity. Typical drying temperature range from 40° C. to 120° C., preferably from 50° C. to 100° C. The coating thickness of the dried primer can vary from 0.3 to 10 µm, preferably from 0.5 to 8 µm, more preferably from 0.6 to 5 µm. By adjusting primer's coating thickness, coating's tackiness, drying speed, haziness, adhesion, and ink's image quality can be adjusted and optimized.

A key desirable feature of clear film packaging is film clarity, which is commonly measured by haze. Haze is the percentage of light transmitted through a film that is deflected more than 2.5° from the direction of the incoming beam. The lower haze value represents higher film clarity and thicker film and extra coating usually contribute to increased haze. Preferably after primer coating, haze change from the base film substrate is less than 10, more preferably less than 5.

Ink Sets

The term "ink set" refers to all the individual inks or other fluids an inkjet printer is equipped to jet. The white inks used to print the image after printing the colored inks or the white ink used to print prior to printing the colored inks are considered part of the ink set. This ink set, together with the primer fluid, forms an inkjet ink and primer fluid set.

In one preferred embodiment, the ink set comprises at least two differently colored inkjet inks, at least one of which is a white pigmented inkjet ink as described above.

In another preferred embodiment, the ink set comprises at least four differently colored inkjet inks, wherein at least one is a cyan inkjet ink, at least one is a magenta inkjet ink, at least one is a yellow inkjet ink, and at least one is a white inkjet ink.

In addition to the colored inkjet inks just mentioned, it is also preferable to include a black inkjet ink in the ink set.

In addition to the CMYKW inks mentioned above, the ink sets may contain additional differently colored inks, as well as different strength versions of the CMYKW and other inks.

For example, the ink sets of the present invention can comprise full-strength versions of one or more of the inks in the ink set, as well as "light" versions thereof.

Additional colors for the inkjet ink set include, for example, orange, violet, green, red and/or blue.

The preferred inks in the ink sets are pigmented inks.

Pigments

The colorant used for printing the colored image may be a dye or a pigment. Dyes include disperse dyes, reactive dyes, acid dyes and the like. The term "pigment" as used herein means an insoluble colorant that requires to be dispersed with a dispersant and processed under dispersive conditions in the presence of a dispersant. Pigmented inks are preferred.

Pigments suitable for being used are those generally well-known in the art for aqueous inkjet inks. The selected pigment(s) may be used in dry or wet form. For example, pigments are usually manufactured in aqueous media, and the resulting pigments are obtained as a water-wet presscake. In presscake form, the pigment does not agglomerate to the extent it would in dry form. Thus, pigments in water-wet presscake form do not require as much mixing energy to de-agglomerate in the premix process as pigments in dry form. Representative commercial dry pigments are listed in U.S. Pat. No. 5,085,698.

Some examples of pigments with coloristic properties useful in inkjet inks include, but not limited to: cyan pigments from Pigment Blue 15:3 and Pigment Blue 15:4; magenta pigments from Pigment Red 122 and Pigment Red 202; yellow pigments from Pigment Yellow 14, Pigment Yellow 74, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 254, Pigment Red 184, Pigment Red 264 and Pigment Red PV19; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; and black pigment carbon black. The pigment names and abbreviations used herein are the "C.I." designation for pigments established by Society of Dyers and Colourists, Bradford, Yorkshire, UK and published in The Color Index, Third Edition, 1971.

Examples of white color materials include, but are not limited to, white inorganic pigments such as Titanium Oxide, Zinc Oxide, zinc sulfide, antimony oxide, and zirconium oxide. Besides such white inorganic pigments, white organic pigments such as white hollow resin particles and polymeric particles can also be used. The preferred pigment for the aqueous pigmented white ink is titanium dioxide. Titanium dioxide (TiO2) pigment useful may be in the rutile or anatase crystalline form. It is commonly made by either a chloride process or a sulfate process. In the chloride process, TiCl4 is oxidized to TiO2 particles. In the sulfate process, sulfuric acid and ore containing titanium are dissolved, and the resulting solution goes through a series of steps to yield TiO2. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the ink. For applications demanding high hiding or decorative printing applications, the titanium dioxide particles preferably have an average size of less than about 1 micron (1000 nanometers). Preferably, the particles have an average size of from about 50 to about 950 nanometers, more preferably from about 75 to about 750 nanometers, and still more preferably from about 100 to about 500 nanometers. These titanium dioxide particles are commonly called pigmentary TiO2.

For applications demanding white color with some degree of transparency, the pigment preference is "nano" titanium dioxide. "Nano" titanium dioxide particles typically have an average size ranging from about 10 to about 200 nanometers, preferably from about 20 to about 150 nanometers, and more preferably from about 35 to about 75 nanometers. An ink comprising nano titanium dioxide can provide improved chroma and transparency, while still retaining good resistance to light fade and appropriate hue angle. A commercially available example of an uncoated nano grade of titanium oxide is P-25, available from Evonik (Parsippany N.J.).

The titanium dioxide pigment may be substantially pure titanium dioxide or may contain other metal oxides, such as silica, alumina and zirconia. Other metal oxides may become incorporated into the pigment particles, for example, by co-oxidizing or co-precipitating titanium compounds with other metal compounds. If co-oxidized or co-precipitated metals are present, they are preferably present as the metal oxide in an amount from about 0.1 wt % to about 20 wt %, more preferably from about 0.5 wt % to about 5 wt %, and still more preferably from about 0.5 wt % to about 1.5 wt %, based on the total titanium dioxide pigment weight.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. Such coatings may optionally be present in an amount of from about 0.1 wt % to about 10 wt %, and preferably from about 0.5 wt % to about 3 wt %, based on the total weight of the titanium dioxide pigment. These coatings can provide improved properties including reducing the photoreactivity of the titanium dioxide. Commercial examples of such coated titanium dioxides include R700 (alumina-coated, available from Chemours, Wilmington Del.), RDI-S (alumina-coated, available from Kemira Industrial Chemicals, Helsinki, Finland), R706 (available from Chemours, Wilmington Del.) and W-6042 (a silica alumina treated nano grade titanium dioxide from Tayco Corporation, Osaka Japan).

The titanium dioxide pigment may also bear one or more organic surface coatings, such as, for example, carboxylic acids, silanes, siloxanes and hydrocarbon waxes, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

Polymeric Dispersant

Traditionally, pigments are stabilized by dispersing agents, such as polymeric dispersants or surfactants, to produce a stable dispersion of the pigment in the vehicle. More recently though, so-called "self-dispersible" or "self-dispersing" pigments (hereafter "SDP") have been developed. As the name would imply, SDPs are dispersible in water without dispersants. Dispersed dyes are also considered pigments as they are insoluble in the aqueous inks used herein.

The polymeric dispersant for the non-self-dispersing pigment(s) may be a random or a structured polymer. Typically, the acrylic based polymer dispersant is a copolymer of hydrophobic and hydrophilic monomers. Some examples of hydrophobic monomers used are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Quaternary salts of dimethylaminoethyl(meth)acrylate may also be employed. The "random polymer" means polymers where molecules of each monomer are randomly arranged in the polymer backbone. For a reference on suitable random polymeric dispersants, see: U.S. Pat. No. 4,597,794. The "structured polymer" means polymers having a block, branched, graft or star structure. Examples of structured polymers include AB or BAB block copolymers such as the ones disclosed in U.S. Pat. No. 5,085,698; ABC block copolymers such as the ones disclosed in EP Patent Specification No. 0556649; and graft polymers such as the ones disclosed in U.S. Pat. No. 5,231,131. Other polymeric dispersants that can be used are described, for example, in U.S. Pat. Nos. 6,117,921, 6,262, 152, 6,306,994 and 6,433,117.

The "random polymer" also includes polyurethanes. Particularly useful are the polyurethane dispersant disclosed in U.S. Patent Application Publication No. 2012/0214939 where the polyurethane dispersant is crosslinked after dispersing a pigment to form a pigment dispersion.

Colored Pigment Dispersion

The color pigment dispersion which are stabilized by added polymer dispersant may be prepared by methods known in the art. It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or deflocculating the pigment.

The premixing step is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 120 minutes. The subsequent dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ and nylon. These various dispersion processes are in a general sense well known in the art, as exemplified by U.S. Pat. Nos. 5,022,592, 5,026,427, 5,310,778, 5,891,231, 5,976,232 and US20030089277. The disclosures of each of these publications are incorporated by reference herein for all purposes as if fully set forth. Preferred are 2-roll mill, media mill, and by passing the mixture through a plurality of nozzles within a liquid jet interaction chamber at a liquid pressure of at least 5,000 psi.

After the milling process is complete the color pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

White Pigment Dispersion

One or more dispersants described for colored pigment are also employed to stabilize the titanium dioxide. It is generally desirable to make the stabilized TiO2 pigment in concentrated slurry form. TiO2 slurry is generally done in a stirred mixing vessel, and a high-speed disperser (HSD) is particularly suitable for the mixing step. A Cowels type blade attached to the HSD and operated at from 500 rpm to 4000 rpm, and more typically from 2000 rpm to 3500 rpm, provides optimal shear to achieve the desired mixing. Adequate mixing is usually achieved after mixing under the conditions described above for a period of from 15 to 600 minutes. The amount of titanium dioxide present in the slurry composition is preferably from about 35 wt % to about 80 wt %, based on the total slurry weight, more preferably from about 50 wt % to about 75 wt %, based on the total weight of the slurry. The titanium dioxide has a 50% average particle size (hereinafter referred to as "D50") that is preferably in the range of 50 to 500 nm, more preferably in the range of 150 to 350 nm. The titanium dioxide having a D50 within these ranges enables printed film to exhibit satisfactory opacity of the image, which enables formation of an image with high quality.

In the case of color pigments, the ink may contain up to approximately 30%, preferably about 0.1 to about 25%, and more preferably about 0.25 to about 10%, pigment by weight based on the total ink weight. If an inorganic pigment such as TiO2 pigment is selected, the ink will tend to contain higher weight percentages of pigment than with comparable inks employing color pigment, and may be as high as about 75% in some cases, since inorganic pigments generally have higher specific gravities than organic pigments.

Post Modification of a Polymeric Dispersant After Formation of a Pigment Dispersion The polymeric dispersant dispersing a pigment may be crosslinked after a pigment dispersion is prepared to form a crosslinked pigment dispersion prior to its inclusion in an inkjet ink. The crosslinkable polymeric dispersant are polymers substituted with crosslinkable moieties selected from the group consisting of acetoacetoxy, acid, amine, epoxy, hydroxyl, blocked isocyanates and mixtures thereof. The crosslinking agent is selected from a group consisting of acetoacetoxy, acid, amine, anhydride, epoxy, hydroxyl, isocyanates, blocked isocyanates and mixtures thereof. In the crosslinking step, a crosslinking agent is added to the pigment dispersion after the pigment is dispersed and crosslinking took place by heating the mixture for several hours at elevated temperature. After the crosslinking step excess polymer can be removed by purification processes such as ultrafiltration. Specific examples of crosslinking moiety/agent pairs are hydroxyl/isocyanate and acid/epoxy.

Ink Polymeric Binder

An ink binder for CMYKW inks is a polymeric compound or a mixture of polymeric compounds that is added to an ink formulation. The binder can impart properties to the printed material that, for example, gives greater durability to the printed material. Typical polymers used as binders in inkjet inks include polyurethane dispersions and polyurethane solutions, acrylics, styrene acrylics, styrene butadienes, styrene butadiene acrylonitriles, neoprenes, ethylene acrylic acids, ethylene vinyl acetate emulsions, latexes and the like. The binder may be a solution or stabilized as an emulsion by having ionic substituents such as carboxylic acids, sulfur containing acids, amine groups, and other similar ionic groups. Alternatively, the binder may be stabilized by external surfactants. The binder can be used singly or in combination with other binders. Typically, the binder is a polyurethane and acrylic. The binder is typically present in an ink in an amount of at least 0.2% by weight based on the total weight of the ink. Examples of ink binder polymer include polyurethane polymers such as Takelac® WS5100, Takelac® WS4022, Takelac® W5030, XW-Um601 and XW-Um602A from Mitsui Chemicals (Tokyo, Japan); Acrylic polymers such as Johncryl® FLX5000-A, Johncryl® FLX5220 and Johncryl® FLX5026A from BASF (Ludwigshafen, Germany).

Typically, a binder is different from the polymer dispersant described above and is neither reactive nor adsorptive to the colorant. The binder is typically added to an ink during the final formulation stage, not during the preparation of a pigment dispersion. The binder is typically present in an ink in an amount of at least 0.2% by weight, based on the total weight of the ink. The amount can be from 1 to 15 wt %, based on the total weight of the ink.

Ink Vehicle

The pigmented ink of this disclosure comprises an ink vehicle typically an aqueous ink vehicle, also known as an aqueous carrier medium, the aqueous dispersion and optionally other ingredients.

The ink vehicle is the liquid carrier (or medium) for the aqueous dispersion(s) and optional additives. The term "aqueous ink vehicle" refers to an ink vehicle comprised of water or a mixture of water and one or more organic, water-soluble vehicle components commonly referred to as co-solvents or humectants. Selection of a suitable mixture depends on requirements of the specific application, such as desired surface tension and viscosity, the selected pigment, drying time of the pigmented ink jet ink, and the type of media onto which the ink will be printed.

Examples of water-soluble organic solvents and humectants include: alcohols, ketones, keto-alcohols, ethers and others, such as thiodiglycol, Sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

A mixture of water and a polyhydric alcohol, such as diethylene glycol, is typical as the aqueous ink vehicle. In the case of a mixture of water and diethylene glycol, the ink vehicle usually contains from 30% water and 70% diethylene glycol to 95% water and 5% diethylene glycol, more typically from 60% water and 40% diethylene glycol to 95% water and 5% diethylene glycol. Percentages are based on the total weight of the ink vehicle. A mixture of water and butyl carbitol is also an effective ink vehicle.

The amount of ink vehicle in the ink is typically in the range of from 70% to 99.8%, and more typically from 80% to 99.8%, by weight based on total weight of the ink.

The ink vehicle can be made to be rapid drying by including solvents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Typical 1,2-alkanediols are C4-C6 alkanediols with 1,2-hexanediol being most typical. The amount of glycol ether(s) and 1,2-alkanediol(s) added is typically in the range of from 1% to 15%, and more typically from 2% to 10% by weight, based on the total weight of the ink.

Surfactants are commonly added to inks to adjust surface tension and wetting properties. Suitable surfactants include ethoxylated acetylene diols (e.g. Surfynol® series commercially available from Evonik), ethoxylated alkyl primary alcohols (e.g. Neodol® series commercially available from Shell) and secondary alcohols (e.g. Tergitol® series commercially available from Dow Chemical), sulfosuccinates (e.g. Aerosol® series commercially available from Cytec), organosilicones (e.g. DYNOL™ series commercially available from Evonik) and fluoro surfactants (e.g. CAPSTONE™ series commercially available from Chemours). Surfactants are typically used in amounts up to about 3% and more typically in amounts up to 1% by weight, based on the total weight of the ink.

Other ingredients, additives, may be formulated into the inkjet ink, to the extent that such other ingredients do not interfere with the stability and jettability of the inkjet ink. This may be readily determined by routine experimentation by one skilled in the art.

Inclusion of sequestering (or chelating) agents such as ethylenediaminetetraacetic acid, iminodiacetic acid, ethylenediamine-di(o-hydroxyphenylacetic acid), nitrilotriacetic acid, dihydroxyethylglycine, trans-1,2-cyclohexanediaminetetraacetic acid, diethylenetriamine-N,N,N',N'',N''-pentaacetic acid, and glycoletherdiamine-N,N,N',N'-tetraacetic acid, and salts thereof, may be advantageous, for example, to eliminate deleterious effects of heavy metal impurities.

Biocides may be used to inhibit growth of microorganisms.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 45 dyne/cm at 25° C. Viscosity can be as high as 30 cP at 25° C., but is typically much lower, more typically less than 10 cP at 25° C. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic. Preferred pH for the ink is in the range of from about 6.5 to about 8.5.

Printing

The present method relates to digitally printing a non-porous plastic film substrate. Typically, this involves the following steps:

(a) providing an inkjet printer that is responsive to digital data signals;

(b) providing a non-porous plastic substrate;

(c) applying an aqueous primer composition comprising a multivalent cation salt and a polymeric binder onto the non-porous plastic substrate to form a coating with a dry thickness of from 0.4 to 5.0 micron, wherein said coating results in a haze increase of less than 10 on said substrate, said multivalent cation salt is present at an amount less than 20 wt %, based on the total weight of the primer composition, and said polymeric binder is not soluble in water, is stable in the presence of said multivalent cation, and is selected from the group consisting of urethane polymer, acrylic polymer and vinyl polymer;

(d) loading the printer with an aqueous white inkjet ink and one or more aqueous non-white colored inkjet inks, wherein said white inkjet ink comprising a titanium oxide pigment dispersion, and a polyurethane binder or an acrylic binder, said titanium oxide pigment dispersion having a particle size of D50 in the range of 200 to 350 nm; and wherein at least one of the aqueous non-white colored inkjet inks comprising a pigment dispersion, and a second-polyurethane binder or a second acrylic binder; and (e) printing onto the primer coated substrate of step (c) using the white inkjet ink and non-white colored inkjet inks in response to digital signals.

In step (e), the white ink can be printed first as a background image followed by color ink. Alternatively, the non-white colored inks can be first printed and then covered by the white ink in a reverse printing setting. Drying between the non-white colored inks or between white and non-white colored inks are optional.

Printing can be accomplished by any inkjet printer equipped for handling and printing film substrate. Film printed with pigmented inks will be dried at elevated temperature after printing. Temperature range varied with printer and dryer design and line speed, as long as it is not too high to cause damage on the films. Generally, drying temperatures will be at highest 120° C. and preferably not higher than 100° C., more preferably not above 95° C.

EXAMPLES

The invention is further illustrated by, but not limited to, the following examples, in which parts and percentages are by weight unless otherwise noted.

INGREDIENTS AND ABBREVIATIONS

DBTL=dibutyltindilaurate
DMPA=dimethylol propionic acid
EDA=ethylene diamine
IPDI=isophoronediisocyanate
TEA=triethylamine
TETA=triethylenetetramine
DETA=diethylenetriamine
MEK=methyl ethyl ketone
TMP=TrimethylolPropane
DMEA=dimethyl ethanolamine
CHDM=1,4-cyclohexanedimethanol
Unless otherwise noted, the above chemicals were obtained from Aldrich (Milwaukee, WI) or other similar suppliers of laboratory chemicals.
Terathane® T650—polyether polyol from Invista (Wilmington, DE)
Desmorphen® C1200—polyester polyol from Covestro (Leverkusen, Germany)
Tegomer® D3403—polyether polyol from Evonik (Essen, Germany)
Eternacoll® UC-100 and UH-50—polycarbonate polyol from UBE industries (Tokyo, Japan)
Surfynol®440, 420 and 465—nonionic surfactant from Evonik (Essen, Germany) Byk® 348—silicone surfactant from BYK (Wesel, Germany)
Dynol™ 980—silicone surfactant from Evonik (Essen, Germany)
SNOWTEX® ST-AK-ML—nano-silica dispersion from Nissan Chemical America (Houston TX)
Aquacer® 513—wax emulsion from BYK (Wesel, Germany)
Takelac™ W6355—waterborne polyurethane resin from Mitsui Chemicals (Tokyo, Japan)
Baybond PU1810/1, Impranil® DLU—waterborne polyurethane resin from Covestro (Leverkusen, Germany)
Mowinyl 6950—acrylic emulsion resin from Japan Coating Resin Corp. (Osaka, Japan)
Mowinyl 3500—Vinyl acetate copolymer resin from Japan Coating Resin Corp. (Osaka, Japan)

Preparation of Primer Binder

Primer Binder P-1

To a dry, alkali- and acid-free flask, equipped with an addition funnel, a condenser, stirrer and a nitrogen gas line were added 55 g CHDM, 130 g Terathane T650, 75 g Tegomer D3403, 10 g DMPA, 7.5 g TEA and 235 g MEK. The contents were heated to 50° C. and thoroughly mixed. 195 g IPDI was then added to the flask via the addition funnel at 40° C. over a period of 5 min, with any residual IPDI being rinsed from the addition funnel into the flask with 10 g MEK.

The flask temperature was raised to 65° C., held until the NCO % reached 2.0% or less. The flask was allowed to cool to 55° C., and 877 g deionized (DI) water was added over 10 minutes, followed by 73 g DETA (as a 10% solution in water) over 5 minutes, via the addition funnel. The mixture was held at 50° C. for 1 hour, then cooled to room temperature.

MEK (~245 g) was removed under vacuum, leaving a final dispersion of polyurethane with about 30.0% of solids by weight.

Following procedures similar to the preparation of Primer Binder P-1, Primer Binders P2-P5 were prepared using ingredients listed in Table 1 below.

TABLE 1

| Ingredient/Weight (g) | Primer Binder P-1 | Primer Binder P-2 | Primer Binder P-3 | Primer Binder P-4 | Primer Binder P-5 |
|---|---|---|---|---|---|
| IPDI | 195 | 400 | 462 | 205 | 167 |
| DMPA | 10 | 19 | 22 | 10 | 10 |
| Terathane T650 | 130 | 200 | 264 | | 185 |
| Tegomer D3403 | 75 | 142 | 166 | 95 | 75 |
| Eternacoll UH50 | | | | 100 | |
| 1,3 propanediol | | | | 30 | |
| TEA | 7.5 | 12.8 | 14.8 | 7.5 | 7.5 |
| TETA | | | | 8.0 | |

TABLE 1-continued

| Ingredient/Weight (g) | Primer Binder P-1 | Primer Binder P-2 | Primer Binder P-3 | Primer Binder P-4 | Primer Binder P-5 |
|---|---|---|---|---|---|
| TMP | | | 15.4 | | |
| DETA | 7.3 | 30 | 30 | | 6 |
| CHDM | 55 | 130 | 120 | | 28 |

Additional primer binders used included Takelac W6355, a polyurethane from Mitsui Chemical, Baybond PU1810/1, a polyurethane polymer from Covestro, Mowinyl 6950, an acrylic polymer, and Mowinyl 3500, a vinyl acetate polymer from Japan Coating Resin Corporation.

Primers A-N were prepared using ingredients listed in Tables 2 and 3 below by combining the listed ingredients with agitation and mixing until a homogeneous mixture is obtained.

TABLE 2

| Component weight % (dry weight basis) | Primer A | Primer B | Primer C | Primer D | Primer E | Primer F |
|---|---|---|---|---|---|---|
| Calcium nitrate tetrahydrate | | | | 3.5 | | |
| Calcium chloride dihydrate | 0.6 | 1.5 | | | | |
| Magnesium Sulfate | | | 1.5 | | | |
| Magnesium Nitrate hexahydrate | | | | | 3 | 3 |
| 1,2 Propanediol | | | 2.5 | | | |
| 1,3 Propanediol | | | | 5 | 2.5 | 2.5 |
| Surfynol 465 | | | 0.5 | 1 | 1 | 1 |
| Takelac W6355 | | 35 | | | | |
| Primer Binder P-1 | | | 33 | | | |
| Primer Binder P-2 | | | | 33 | 33 | 33 |
| Primer Binder P-4 | 27 | | | | | |
| Snowtex ST-AK-ML | | | | | | 1.6 |
| DI water | | | Balance to 100% | | | |

TABLE 3

| Component weight % (dry weight basis) | Primer G | Primer H | Primer I | Primer J | Primer K | Primer L | Primer M | Primer N |
|---|---|---|---|---|---|---|---|---|
| Calcium nitrate tetrahydrate | | | | | | | | |
| Calcium chloride dihydrate | | | | | | | 0.9 | 0.9 |
| Magnesium nitrate hexahydrate | 3 | 3 | 1.8 | 1.8 | 1.8 | 2.25 | | |
| 1,3 Propanediol | | 3 | 5 | 5 | 5 | | | |
| Dipropylene glycol methyl ether | 5 | | | | | | | |
| Surfynol 465 | 0.5 | 1 | 0.5 | 0.5 | 0.5 | | | |
| Primer Binder P-1 | | 33 | | | | | | |
| Primer Binder P-3 | 35 | | | | | | | |
| Primer Binder P-5 | | | 33 | 6.5 | 6.5 | | | |
| Baybond PU1810/1 | | | | | | 30 | | |
| Mowinyl 6950 | | | | | | | 45 | |
| Mowinyl 3500 | | | | | | | | 40 |
| Snowtex ST-AK-ML | | | | 19 | 19 | | | |
| Aquacer 513 | | | | | | 0.1 | | |
| DI water | | | | Balance to 100% | | | | |

Comparative Primers A and B were prepared using ingredients listed in Table 4 below.

TABLE 4

| Component weight % (dry weight basis) | Comparative Primer A | Comparative Primer B |
|---|---|---|
| Magnesium Nitrate hexahydrate | 2.5 | 23 |
| 1,3 Propanediol | | 5 |
| Surfynol 465 | | 0.5 |
| Impranil DLU | 30 | |
| Primer Binder P-5 | | 16 |
| Snowtex ST-AK-ML | | 7 |
| DI Water | Balance to 100% | |

Another comparative primer, Comparative Primer C, PP-17, was supplied by Meisei Chemical Works, LTD. Kyoto, Japan.

Mylar MLBT, a clear PET film from DuPont Teijing Film, was coated with the primer fluid using a Gardco film applicator rod having a wire size of 2.5 (Paul N. Gardner Inc., Florida, USA) to form a coating having a dry thickness varying from 0.5 to 2.0 micron depending on solids and viscosity. The coating was dried in a 65° C. convection oven for 3 minutes. Two types of films were coated. One was a PET film, Mylar MLBT from DuPont Teijing Film. Film haze was measured before and after coating using a BYK haze-gard i following the ASTM D 1003 method. Before the coating of a primer, the Mylar MLBT film has a haze reading of 4.80.

Each treated film's transparency was rated by a visual inspection, and was given a rating from 1 to 3, with "1" designating no change from the base film, "2" designating slightly cloudy, and "3" designating cloudy or forming cracks.

The blocking resistance was tested by folding a printed film face to face to itself immediately after drying. A weight was laid on top of the folded film such that a pressure of 9 kg/cm$^2$ was applied for 12 hours. The weight was then lifted and the folded film was pulled apart. Blocking resistance was rated according to the following protocol, and results are shown in Table 5 below.

Rating 1, no coating damage and the film falls apart without any sound

Rating 2, no coating damage and the film falls apart with a cracking sound

Rating 3, slight damage of the coating or coating appears to be cloudy

Rating 4, large damage of the coating, such as a coating becomes peelable from the base film

TABLE 5

| Primers | Transparency Rating | Haze | Haze Change | Blocking Rating |
|---|---|---|---|---|
| Primer-A | 1 | 4.56 | −0.24 | 2 |
| Primer-B | 1 | 4.34 | −0.46 | 3 |
| Primer-C | 2 | 6.82 | 2.26 | 3 |
| Primer-D | 1 | 4.98 | 0.42 | 1 |
| Primer-E | 1 | 4.46 | −0.1 | 1 |
| Primer-F | 1 | 4.67 | 0.11 | 1 |
| Primer-G | 2 | 6.82 | 2.26 | 1 |
| Primer-H | 1 | 4.84 | 0.28 | 3 |
| Primer-I | 1 | 4.09 | −0.47 | 4 |
| Primer-J | 1 | 4.78 | 0.22 | 1 |
| Primer-K | 1 | 4.42 | −0.14 | 1 |
| Primer-L | 2 | 5.15 | 0.59 | 2 |
| Primer-M | 1 | 5.71 | 1.15 | 2 |
| Primer-N | 2 | 5.19 | 0.63 | 1 |
| Comparative Primer A | 2 | 15.73 | 11.17 | 3 |
| Comparative Primer B | 3 | 59 | 54.4 | 1 |
| Comparative Primer C | 3 | 96 | 91.44 | 1 |

CMYK Inks and White Ink

Cyan Pigment Dispersion

A cyan dispersion was prepared according to a procedure disclosed in U.S. Patent Application Publication No. 2012/0214939, the disclosure of which is incorporated by reference herewith for all purposes as if fully set forth. A cyan TRB2 pigment was employed, and the dispersant was cross-linked after dispersing the pigment.

Yellow Pigment Dispersion

A yellow dispersion was prepared in a similar fashion as the Cyan Dispersion with the exception of using yellow pigment PY74.

Magenta Pigment Dispersion

A magenta dispersion was prepared in a similar fashion as the Cyan Dispersion with the exception of using magenta pigment PR122.

Black Pigment Dispersion

A black dispersion was prepared in a similar fashion as the Cyan Dispersion with the exception of using carbon black pigment.

TiO2 Pigment Dispersion

Preparation of Titanium dioxide dispersion can be found in Patent Application Publication No. US20070060670, which is incorporated by reference herein as if fully set forth.

Ink Polymer Binder

PUD-A1

To a dry, alkali- and acid-free flask, equipped with an addition funnel, a condenser, stirrer and a nitrogen gas line were added 15.8 g CHDM, 104.7 g Terathane T650, 4.0 g TMP, and 118 g acetone. The contents were heated to 40° C. and thoroughly mixed. 120 g IPDI was then added to the flask via the addition funnel at 40° C. over 5 min, with any residual IPDI being rinsed from the addition funnel into the flask with 2 g acetone.

The flask temperature was raised to 50° C. After holding at 50° C. for 240 minutes, an additional 15.8 g of DMPA, followed by 11 g of TEA, were added to the flask via the addition funnel, which was then rinsed with 2 g of acetone. The flask temperature was then raised again to 50° C. and held at 50° C. until NCO % reached 2.0% or less.

With the temperature at 50° C., 570 g of deionized (DI) water was added over 10 minutes, followed by 38 g EDA (as a 10% solution in water) over 5 minutes, via the addition funnel. The mixture was held at 50° C. for 1 hr, and then cooled to room temperature.

Acetone (~122.0 g) was removed under vacuum, leaving a final dispersion of polyurethane with about 30.0% solids by weight.

All PUD type polymers in Table 6 below were made using similar processes. The polyurethane PUD EX2 described in U.S. Pat. No. 9,255,207 was employed as polyurethane polymer binder PUD-A7.

TABLE 6

| Monomer weight | PUD-A1 | PUD-A2 | PUD-A3 | PUD-A4 | PUD-A5 | PUD-A6 |
|---|---|---|---|---|---|---|
| IPDI | 120 | 205 | 205 | 200 | 220 | 221.5 |
| DMPA | 15.8 | 27 | 27 | 25 | 21 | 52 |
| Terathane T650 | 104.7 | 180 | 180 | 300 | | |
| Eternacoll UC-100 | | | | | | 412 |
| TEA | 1.1 | 2.0 | 1.8 | 17 | 14 | 35 |
| EDA | 3.8 | 6.5 | 6.5 | | | 1.1 |
| TMP | 4.0 | 7 | 7 | 7 | 6 | |
| DETA | | | | 8.5 | 8.5 | |
| CHDM | 15.8 | 27 | 27 | | 85 | |
| Ammonia (28%) | | 12 | | | | |
| DMEA | | | 14.5 | | | |

Preparation of Inks

Inks used in the examples were made according to standard procedures in the inkjet art. Ingredient amounts are in weight percent of the final ink. Polymer binders and colorants are quoted on a solids basis. As an example of ink preparation, an ink vehicle was prepared and added with stirring to an aqueous ink binder. After stirring until a homogeneous mixture was obtained, the solution was added to a pigment dispersion and mixed until homogeneous again. Inks 1-7 were prepared using ingredients listed in Table 7 below.

TABLE 7

| Ingredients | Ink-1 | Ink-2 | Ink-3 | Ink-4 | Ink-5 | Ink-6 | Ink-7 |
|---|---|---|---|---|---|---|---|
| | (Wt %, based on total weight of ink) | | | | | | |
| Cyan pigment | 3% | 3% | | | | | |
| Magenta pigment | | | 5.5% | | | | |
| Yellow pigment | | | | 5% | | | |
| Black pigment | | | | | | 6% | |
| White pigment | | | | | | | 10% |
| PUD-A1 | | 3% | | 3% | 3% | 2.5% | |
| PUD-A6 | | | 5% | | | | |
| PUD-A7 | 6% | | | | | | 5% |
| 1,3 Propanediol | 18% | 15% | 15% | 11% | 14% | 11% | 13% |
| 1,2 Propanediol | | 15% | | 11% | 14% | 11% | 13% |
| Propylene glycol di-methyl ether | | | 7.5% | | | | |
| Dipropylene glycol n-propyl ether | | | 2.5% | | | | |
| Surfynol 420 | 0.5% | 0.1% | | 0.2% | 0.2% | 0.2% | |
| Surfynol 440 | | 0.5% | | 0.5% | 0.5% | 0.4% | |
| Dynol 980 | | | 1% | | | | |
| Byk 348 | | | | | | | 0.25% |
| DI water | | | Balance to 100% | | | | |

Printing

The film used for printing was a primer coated Mylar MLBT from DuPont Teijing Film. The film was coated with a primer, and then printed with an example ink using a lab printing system. In this printing system, inks were jetted from a mounted stationery Fuji (Tokyo, Japan) Samba G3L printhead onto the film held to the rotating cylinder underneath. A 1 inch by 4 inches solid block with an ink coverage of about 5 g/m² was printed. The printed film was subsequently dried at 65° C. for 3 minutes. Image quality was rated by a visual color homogeneity assessment, and color OD was measured using an X-Rite Greytag Macbeth spectrophotometer. A film without primer coating was printed for comparison as well. Color of the white ink was reported as opacity instead of OD. Opacity is equal to 100 times the ratio of the diffuse reflectance of a white printed film sample backed by a black body (<0.5% reflectance) to the diffuse reflectance of the same sample backed by a white body (89% reflectance). For white ink 7, optical density of prints over white tile was 0.78 and optical density of prints over black tile was 0.45 which resulted in opacity of 57.7.

$$\text{Opacity} = 100 * [10^{-(density\ over\ black\ tile)} / 10^{-(density\ over\ white\ tile)}]$$

Image quality was rated as the following,

Rating 1, excellent color uniformity and coverage

Rating 2, uniform color with some white lines due to ink misdirect or missing jets Rating 3, de-wetting and thicker ink lines on the edge of the block color Results of image quality and OD or opacity are shown in Tables 8-10 below. The OD of an ink without a primer was not measured due to poor image quality.

TABLE 8

| Ink | Ink-1 | Ink-1 | Ink-1 | Ink-1 | Ink-2 | Ink-2 | Ink-3 |
|---|---|---|---|---|---|---|---|
| Primer | No primer | Primer-B | Primer-J | Primer-K | Primer-E | Primer-H | Primer-E |
| Image quality rating | 3 | 2 | 1 | 2 | 2 | 1 | 1 |
| OD | NA | 1.42 | 1.63 | 1.61 | 1.58 | 1.63 | 1.49 |

TABLE 9

| Ink | Ink-4 | Ink-4 | Ink-5 | Ink-5 | Ink-6 | Ink-6 |
|---|---|---|---|---|---|---|
| Primer | Primer E | Primer H | Primer E | Primer H | Primer E | Primer H |
| Image quality | 1 | 1 | 2 | 1 | 1 | 1 |
| OD | 1.48 | 1.47 | 1.16 | 1.16 | 2.20 | 2.15 |

TABLE 10

| Ink | Ink-7 |
|---|---|
| Primer | Primer H |
| Image quality | 1 |
| Opacity | 57.5 |

What is claimed is:

1. An inkjet ink and primer fluid set comprising:
a) an aqueous primer composition comprising a multivalent cation salt and a polymeric binder, wherein said composition forms a coating with a dry thickness of from 0.4 to 5.0 micron upon application onto a non-porous plastic substrate, and said coating results in a haze increase of less than 10 on said substrate, said multivalent cation salt is present at an amount less than 20 wt %, based on the total weight of the primer composition, and said polymeric binder is not soluble in water, is stable in the presence of said multivalent cation, and is selected from the group consisting of urethane polymer, acrylic polymer and vinyl polymer;
b) an aqueous white inkjet ink comprising a titanium oxide pigment dispersion, and a polyurethane binder or an acrylic binder, wherein said titanium oxide pigment dispersion having a particle size with D50 in the range of 200 to 350 nm; and
c) one or more aqueous non-white colored inkjet inks, wherein at least one of the inks comprising a pigment dispersion, and a second polyurethane binder or a second acrylic binder.

2. The fluid set of claim 1, wherein said aqueous primer composition further comprising silica particles.

3. The fluid set of claim 1, wherein said coating results in a haze increase of less than 5 on said substrate.

4. The fluid set of claim 1, wherein said polyurethane binder and said second polyurethane binder are the same.

5. The fluid set of claim 1, wherein said acrylic binder and said second acrylic binder are the same.

6. The fluid set of claim 1, wherein said polymeric binder is urethane polymer.

7. The fluid set of claim 1, wherein said polymeric binder is acrylic polymer.

8. A method of digitally printing an image onto a non-porous plastic substrate comprising the steps of:
(a) providing an inkjet printer that is responsive to digital data signals;
(b) providing a non-porous plastic substrate;
(c) applying an aqueous primer composition comprising a multivalent cation salt and a polymeric binder onto the non-porous plastic substrate to form a coating with a dry thickness of from 0.4 to 5.0 micron, wherein said coating results in a haze increase of less than 10 on said substrate, said multivalent cation salt is present at an amount less than 20 wt %, based on the total weight of the primer composition, and said polymeric binder is not soluble in water, is stable in the presence of said multivalent cation, and is selected from the group consisting of urethane polymer, acrylic polymer and vinyl polymer;
(d) loading the printer with an aqueous white inkjet ink and one or more aqueous non-white colored inkjet inks, wherein said white inkjet ink comprising a titanium oxide pigment dispersion, and a polyurethane binder or an acrylic binder, said titanium oxide pigment dispersion having a particle size of D50 in the range of 200 to 350 nm; and wherein at least one of the aqueous non-white colored inkjet inks comprising a pigment dispersion, and a second-polyurethane binder or a second acrylic binder; and
(e) printing onto the primer coated substrate of step (c) using the white inkjet ink and non-white colored inkjet inks in response to digital signals.

9. The method of claim 8, wherein said aqueous primer composition comprising silica particles.

10. The method of claim 8, wherein said coating results in a haze increase of less than 5 on said substrate.

11. The method of claim 8, wherein said polyurethane binder and said second polyurethane binder are the same.

12. The method of claim 8, wherein acrylic binder and said second acrylic binder are the same.

13. The method of claim 8, wherein said polymeric binder is urethane polymer.

14. The method of claim 8, wherein said polymeric binder is acrylic polymer.

15. The method of claim 8, wherein said digital signals cause the white inkjet ink to be printed before the non-white colored inkjet inks are printed in step (e).

16. The method of claim 8, wherein said digital signals cause the white inkjet ink to be printed after the non-white colored inkjet inks are printed in step (e).

* * * * *